United States Patent
Chen

(10) Patent No.: US 11,363,026 B2
(45) Date of Patent: Jun. 14, 2022

(54) WORKFLOW CONTROL METHOD AND SYSTEM BASED ON ONE-TO-ONE CORRESPONDENCE BETWEEN ROLES AND USERS

(71) Applicant: CHENGDU QIANNIUCAO INFORMATION TECHNOLOGY CO., LTD., Sichuan (CN)

(72) Inventor: Dazhi Chen, Meishan (CN)

(73) Assignee: CHENGDU QIANNIUCAO INFORMATION TECHNOLOGY CO., LTD., Sichuan (CN)

(*) Notice: Subject to any disclaimer, the term of this patent is extended or adjusted under 35 U.S.C. 154(b) by 171 days.

(21) Appl. No.: 16/609,444

(22) PCT Filed: Apr. 28, 2018

(86) PCT No.: PCT/CN2018/085162
§ 371 (c)(1),
(2) Date: Oct. 29, 2019

(87) PCT Pub. No.: WO2018/196876
PCT Pub. Date: Nov. 1, 2018

(65) Prior Publication Data
US 2020/0145424 A1    May 7, 2020

(30) Foreign Application Priority Data

Apr. 29, 2017   (CN) .......................... 201710297689.2

(51) Int. Cl.
*H04L 29/06*     (2006.01)
*H04L 9/40*      (2022.01)
*G06Q 10/06*     (2012.01)

(52) U.S. Cl.
CPC ..... *H04L 63/101* (2013.01); *G06Q 10/06316* (2013.01); *G06Q 10/063114* (2013.01); *H04L 63/102* (2013.01); *H04L 63/20* (2013.01)

(58) Field of Classification Search
CPC ..... H04L 63/20; H04L 63/102; H04L 63/101; G06F 21/62; G06F 21/604;
(Continued)

(56) References Cited

U.S. PATENT DOCUMENTS

2006/0090208 A1* 4/2006 Smith .................. G06F 21/604
                                                        726/26
2006/0218394 A1* 9/2006 Yang ..................... G06F 21/604
                                                        713/167

(Continued)

FOREIGN PATENT DOCUMENTS

CN    102468971 A     5/2012
CN    103455888 A    12/2013
(Continued)

OTHER PUBLICATIONS

International Search Report for PCT/CN2018/085162 dated Jul. 2, 2018 and its English translation provided by WIPO.
(Continued)

*Primary Examiner* — Jungwon Chang
(74) *Attorney, Agent, or Firm* — Ladas & Parry, LLP

(57) ABSTRACT

The present invention discloses a workflow control method and system based on a one-to-one correspondence between roles and users, including: building a three-layer structure model of user-role-permission, wherein each role is an independent individual, one role can only be related to a unique user during the same period, and one user is related to one or more roles; using the three-layer structure model to control a workflow, selecting an approval role, and authorizing the approval role; and determining, according to
(Continued)

a user's related role, an approval task to be processed, and performing an approval operation with the permission of the related role. In the present invention, the subject of the approval operation in the workflow is the role. Even if changes on an employee or a user have occurred (such as transfer or resignation), or the approval permissions of the employee have changed, it is only necessary to relate the employee to a new role, or adjust the approval permissions of the existing role accordingly, but not necessary to reset or adjust the processes. The setting is convenient and not prone to errors or omissions. This avoids impact on the normal operation of a company, and significantly improves the reliability of the workflow.

12 Claims, 4 Drawing Sheets

(58) Field of Classification Search
CPC ............ G06F 21/6218; G06Q 10/0633; G06Q 10/063112; G06Q 10/103; G06Q 10/063114; G06Q 10/06316
See application file for complete search history.

(56) References Cited

U.S. PATENT DOCUMENTS

| | | | |
|---|---|---|---|
| 2008/0022370 A1* | 1/2008 | Beedubail | H04L 63/102 726/4 |
| 2012/0203588 A1* | 8/2012 | Burri | G06Q 10/0633 705/7.14 |
| 2014/0075492 A1* | 3/2014 | Kapadia | H04L 63/102 726/1 |
| 2014/0129273 A1* | 5/2014 | Versteeg | G06F 21/62 705/7.14 |
| 2016/0232294 A1 | 8/2016 | Nuggehalli et al. | |
| 2017/0277900 A1* | 9/2017 | Tong | H04L 63/20 |
| 2020/0076818 A1* | 3/2020 | Krishnan | H04L 63/102 |

FOREIGN PATENT DOCUMENTS

| | | |
|---|---|---|
| CN | 104346663 A | 2/2015 |
| CN | 105005730 A | 10/2015 |
| CN | 106529761 A | 3/2017 |
| CN | 107180334 A | 9/2017 |

OTHER PUBLICATIONS

Written Opinion of the International Search Authority PCT/CN2018/085162 dated Jul. 2, 2018 and its English translation provided by Google Translate.
International Preliminary Report for PCT/CN2018/085162 dated Apr. 11, 2019 and its English translation provided by WIPO.
First Office Action and Search Report from CN app. No. 201810398996.4, dated Apr. 27, 2020, with English translation from Global Dossier, all pages.
Second Office Action from CN app. No. 201810398996.4, dated Jan. 6, 2021, with English translation from Global Dossier, all pages.
Decision of Rejection from CN app. No. 201810398996.4, dated May 14, 2021, with English translation generated by Google Translate, all pages.

* cited by examiner

WORKFLOW CONTROL METHOD AND SYSTEM BASED ON ONE-TO-ONE CORRESPONDENCE BETWEEN ROLES AND USERS

BACKGROUND

Technical Field

The present invention relates to a workflow control method in a management software system such as an ERP system, and more particularly to a workflow control method and system based on a one-to-one correspondence between roles and users.

Related Art

Role-based access control (RBAC) is one of the most researched and mature management mechanisms for data in recent years. It is considered to be an ideal candidate to replace conventional mandatory access control (MAC) and discretionary access control (DAC). Conventional discretionary access control has high flexibility but low security. Mandatory access control is highly secure but too restrictive. Role-based access control combines both above, and not only is easy to manage, but also reduces complexity, costs, and probability of errors. Therefore, it has been greatly developed in recent years. The basic idea of role-based access control (RBAC) is to divide different roles according to different functional positions in the enterprise organization view, encapsulate the access permission of database resources in roles, and allow users to indirectly access database resources by assigning different roles to the users.

A large number of tables and views are often built in large application systems which makes the management and permissions of database resources very complicated. It is very difficult for the user to directly manage the access and permissions of the database resources. It requires the user to have a very thorough understanding of the database structure and to be familiar with the use of the SQL language. Once the application system structure or security requirements have changed, a large number of complex and cumbersome permission changes are required, and the security vulnerabilities caused by unexpected authorization errors are very likely to occur. Therefore, designing a simple and efficient permission management method for large-scale application systems has become a common requirement for systems and system users.

The role-based permission control mechanism can manage the access permissions of the system simply and efficiently, which greatly reduces the burden and cost of the system permission management, and makes the system permission management more compliant with the business management specifications of the application system.

However, the conventional role-based permission management and workflow control methods for a user adopt the "role-to user one-to-many" relation mechanism, where the "role" is a group or class in nature. That is, one role can simultaneously correspond to or be related to multiple users, and the role is similar to a post or a position or a type of work or other concepts. The permission granted to a user under this relation mechanism is basically divided into the following three forms:

1. As shown in FIG. 1, the permission is directly granted to the user, where the disadvantage is that the workload is large and the operation is frequent and cumbersome. In the approval process, the approval operation subject of the approval node is the user, and at the workflow approval node, the employee or user is selected directly as an approval subject. When changes on an employee have occurred (such as transfer or resignation), all processes related to the employee shall be adjusted accordingly. Especially, for changes on the employee in a management position of an enterprise, many approval processes are involved. As the adjustment of the processes involves large workloads, and is cumbersome, errors or omissions are likely to occur, affecting the normal operation of the enterprise and even causing unpredictable losses.

Even if the change only occurs in the approval permissions of the employee, it is still necessary to correspondingly adjust the processes related to the employee, and similar problems described above still occur.

2. As shown in FIG. 2, the role (of a class/group/post/work type nature) is authorized (one role may be related to multiple users), the user obtains permissions through its role, and the approval operation subject is the role of a group or class nature.

3. As shown in FIG. 3, the above two methods are combined.

In the above descriptions, as both 2 and 3 need to authorize the role of a class or group nature. The way of authorization and workflow control through the role of a class/group/post/work type nature has the following disadvantages:

1. Operations are difficult when the user's permission has changed: In the actual process of using a system, the user's permissions often need to be adjusted during the operation process. For example, in processing of the change of an employee's permissions, when the permissions of an employee related to the role have changed, it is improper to change the permissions of the entire role due to the change of the permissions of the individual employee, because the role is also related to other employees whose permissions remain unchanged. In response to this situation, either a new role is created to fit the employee whose permissions have changed, or permissions are directly granted to the employee (disengaged from the role) based on permission requirements. The above two processing methods not only take a long time but also cause mistakes easily for the role authorization in the case of a large number of role permissions. It is cumbersome for a user to operate, and errors occur easily, resulting in loss to the system user.

When the approval permissions of the employee or user have changed, either the employee or the user is disengaged from the role, and at the workflow approval node, the employee or the user is directly selected as an approval subject, or a new role is added to meet the requirements of the approval process. In the first way, when changes on an employee have occurred (such as transfer or resignation), all processes related to the employee shall be adjusted accordingly. Especially, for changes on an employee in a management position of an enterprise, many approval processes are involved. As the adjustment of the processes involves large workloads, errors or omissions are likely to occur, affecting the normal operation of the enterprise and even causing unpredictable losses. Even if the change only occurs in the approval permissions of the employee, it is still necessary to correspondingly adjust the processes related to the employee, and similar problems described above still occur. In the second way, adding a role involves creation, relation, and authorization of the role. Especially when there are many roles and many users related to the roles, it is difficult to remember which users are related to the role.

2. It is difficult to remember the specific permissions contained in a role for a long time: If the role has many permission function points, over time, it is difficult to remember the specific permissions of the role, and it is even harder to remember the differences of permissions between roles with similar permissions. The permissions of similar roles are also easily confusable. If a new user needs to be related, it is impracticable to accurately determine how to select a relation.

3. Because user permissions change, it results in more roles created (if new roles are not created, it greatly increases direct authorization to the user), and it is more difficult to distinguish specific differences of the permissions between the roles.

4. When a user is transferred from a post, if many permissions of the transferred user need to be assigned to other users, separating the permissions of the transferred user and creating roles to relate to the other users are necessary. Such operations are not only complicated and time-consuming, but also prone to errors.

SUMMARY

Technical Problems

The object of the present invention is to overcome the deficiencies of the prior art, and provide a workflow control method and system based on a one-to-one correspondence between roles and users. One role can only be related to a unique user during the same period, thus greatly improving the efficiency of the permission management of a system in use, making the dynamic authorization simpler, more convenient, clearer, and more explicit, and improving the efficiency and reliability of the permission setting. The subject of the approval operation in the workflow is the role. When an employee or a user has changed, it only needs to re-relate the user to a role or adjust the role's permissions accordingly. There is no need to reset the process, and the setting is convenient.

Solutions to Problems

Technical Solutions

The object of the present invention is achieved by the following technical solutions. A workflow control method based on a one-to-one correspondence between roles and users includes the following steps:

S1: building a three-layer structure model of user-role-permission that includes:

a role layer, wherein an operation subject of process approval in a workflow is a role, each role is an independent individual rather than a group or class, one role can only be related to a unique user during the same period, and one user is related to one or more roles;

a permission layer including a permission required to be used in the execution of the workflow, wherein the permission is directly granted to a role, and a user layer, wherein a user determines an approval task in the workflow through a related role, and performs an approval operation with the permission of the related role;

S2: using the three-layer structure model to control the workflow, wherein one approval process includes:

one start node initiating or requesting or submitting the workflow;

at least one approval node selecting an approval role and authorizing the approval role; and one end node, to which the approval process comes and then is ended;

S3: determining, according to a user's related role, an approval task to be processed, and performing an approval operation with the permission of the related role.

When a workflow is initiated or requested or submitted at the start node, a start role initiates or requests or submits the workflow, where only a role having the permission to start a workflow can initiate or request or submit the workflow as the start role.

When a workflow is initiated or requested or submitted at the start node, a system determines an approval process according to a form submitted by the start role.

When a workflow is initiated or requested or submitted at the start node, one or more approval processes are designed for a form that requires a workflow, but one role can only select one approval process under the form.

One or more approval roles are selected at the approval node, one role can exist at different approval nodes in one approval process, and the approval role may own different (or same) permissions for viewing and modifying a form field at different approval nodes. Exemplary advantages: A role is a Chengdu sales manager 3. In a contract approval workflow, the role exists at both approval nodes of Chengdu sales contract and Shanghai sales contract. At the approval node of the Chengdu sales contract, the role can view a customer name, a contact person, contact information, a product quantity, a unit price of products, a contract amount and other fields of the contract at the time of approval and may modify the unit price of products and the contract amount. However, at the approval node of the Shanghai sales contract, the role cannot view the content of sensitive fields such as the customer name, contact person, and contact information, and the like, and cannot make any modifications (alternatively, the role may be set to have the view permission but no modification permission).

One or more approval roles are selected at the approval node, an approval role's permission is set at the approval node, and the permission can be independently set for each approval role of each approval node (the permission of each approval role at an approval node can be set to be the same). For example, two approval roles, namely, a role A and a role B, are set at an approval node in the approval process of a contract form. Role A may be allowed to view a contract amount field in the contract form and the value of the field, and view a customer address field in the contract form and the value of the field. Role B is not allowed to view the contract amount field in the contract form, or is allowed to view the contract amount field but not allowed to view the value of the field. The value not allowed to be viewed may be shown as other symbols such as *. Role B can view the customer address field in the contract form and the value of the field.

Step S1 includes the following sub-steps:

S101: creating a role, wherein each role is an independent individual rather than a group or class;

S102: authorizing roles created in step S101 respectively; and

S103: relating a user to a role, wherein one role can only be related to a unique user during the same period, and one user can be related to one or more roles.

Step S101 is preceded, but step S102 and step S103 have no sequential relationship.

Said role belongs to a certain department, said role is unique under the department, and said role is authorized according to work content of said role.

The workflow control method based on a one-to-one correspondence between roles and users further includes a step of managing cross-department transfer of a user, specifically including:

(1) cancelling the user's relation to the role in the original department; and (2) relating the user to a role in a new department.

A workflow control system based on a one-to-one correspondence between roles and users includes a model building unit, a workflow control unit, and an approval operation unit, wherein, Said model building unit is used to build a three-layer structure model of user-role-permission that includes:

a role layer, wherein an operation subject of process approval in a workflow is a role, each role is an independent individual rather than a group or class, one role can only be related to a unique user, and one user is related to one or more roles;

a permission layer including a permission required to be used in the execution of the workflow, wherein the permission is directly granted to a role; and a user layer, wherein a user determines an approval task in the workflow through a related role, and performs an approval operation with the permission of the related role.

Said workflow control unit controls the workflow by using the three-layer structure model, wherein one approval process includes:

one start node initiating or requesting or submitting the workflow;

at least one approval node selecting an approval role and authorizing the approval role; and one end node, to which the approval process comes and then is ended.

In said approval operation unit, the user determines, according to the role related to the user, the approval task to be processed, and performs the approval operation with the permission of the related role.

Said model building unit includes:

a role creation submodule used to perform role layout according to posts and create system roles, wherein each role is an independent individual rather than a group or class;

a role authorization submodule used to authorize the role according to work content of the role;

a user-role relation submodule used to relate the user to the role, ensuring that one role can be related to a unique user during the same period, and one user is related to one or more roles.

Said system role is composed of: a post name+a post number.

Beneficial Effects of the Invention

Beneficial Effects (1) The subject of the approval operation in the workflow is the role that is an independent individual rather than a conventional role of a group or class nature. Even if changes on an employee or a user have occurred (such as transfer or resignation), or if the approval permissions of the employee have changed, it is only necessary to relate the employee to a new role, or adjust the approval permissions of the existing role accordingly, but not necessary to reset or adjust processes. As setting is convenient and no errors or omissions will occur, the normal operation of the enterprise will not be affected, and the reliability of the workflow is greatly improved. The role is taken as the subject of the approval authorization according to the nature of the post number at the approval node. The user determines which approval tasks are available according to the role. The user only needs to perform approval operations based on the permission of the related role. It is clear and simple to understand. Each role that is a post number or a work station number in nature is a minimum unit of the subject of work. The present application can well satisfy different approval requirements of each role.

(2) In the present application, the role is one-to-one related to the user. One role can be related to a unique user during the same period. The advantage of this is that whenever a user is created, no operation of assigning permissions is required any more, as long as the user is related to the role, and changes in the permissions of the role are much fewer than the changes in the permissions of the user in a conventional mechanism. Few changes occur in the quantity of roles that are each an independent individual in nature (a post number or a work station number in nature). Although there is large employee turnover, few changes occur in the post number/work station number (even if there is no change in a certain period, that is, the role does not change). This greatly simplifies user permission management and reduces system overheads.

(3) The operations such as dynamic management, recruitment, and transfer are simple, convenient, efficient and highly reliable. The application of recruitment or departure or transfer in the approval process is simple. The subject of the approval operation of the workflow is the role. When an employee or a user has changed, the approval process does not need to be reset (it only needs to cancel the relation or relate the user to the role). For the user who is no longer in the role of the post number or work station number, the relation to the role is cancelled, and the user who takes over the post number or work station number is related to the role of the post number. Therefore, the user related to the role automatically obtains related tasks and permissions of the role in the approval workflow, without resetting the approval workflow or re-authorizing the role in the workflow, thus greatly improving the efficiency, security, and reliability of the process setting.

For example, because Zhang San user is transferred or departs from a post, Zhang San no longer works as a role of "purchaser 3", and Zhang San cancels the relation to the role. Meanwhile, Li Si takes over the work in the role of "purchaser 3", and then Li Si is related to the role, so Li Si automatically obtains the approval tasks and the approval permissions of the role of "purchaser 3" in the approval process.

(4) The conventional permission management mechanism defines the nature of a group, a work type, a class or the like as the role. The role is in a one-to-many relation to the user. In the actual process of using a system, the user's permissions often need to be adjusted during the operation process. For example, in processing of the change of an employee's permissions, when the permissions of an employee related to the role have changed, it is improper to change the permissions of the entire role due to the change of the permissions of the individual employee, because the role is also related to other employees whose permissions remain unchanged. In order to respond to this situation, either a new role is created to fit the employee whose permissions have changed, or permissions are directly granted to the employee (disengaged from the role) based on permission requirements. The above two processing methods not only take a long time but also cause mistakes easily for the role authorization in the case of a large number of the role permissions.

It is cumbersome for a user to operate, and errors occur easily, resulting in loss to the system user.

However, under the method of the present application, as the role is an independent individual, the object can be achieved by changing the permissions of the role. Although the method in the present application seems to increase a workload during system initialization, by means of copying or the like, the role can be created or authorized more efficiently than the conventional roles of a group nature. As it does not need to consider the commonality of the roles of a group nature when satisfying the related users, the solutions in the present application makes the permission setting clear and explicit. Especially after the system has been used for a period of time (after the permissions of the user/role have changed dynamically), the solutions in the present application can significantly improve the efficiency of the permissions for the system user during the use of the system, make the dynamic authorization simpler, more convenient, clearer and more explicit, and improve the efficiency and reliability of the setting.

(5) The conventional group-based role authorization method is prone to errors. The method provided in the present application significantly reduces the probability of authorization errors, because the method of the present application only needs to consider the role as an independent individual, without considering the commonality of multiple users related to the role of the group nature under the conventional method. Even if the authorization errors occur, only the user related to the role is affected. However, in the case of the conventional role of the group nature, all users related to the role are affected. Even if the authorization errors occur, the correction method in the present application is simple and takes a short time, while in the case of the conventional role of a group nature, the commonality of the permissions of all users related to the role needs to be considered during the error correction. The modification is cumbersome, complex, and error-prone when the role has many function points, and in many cases, the problem cannot be solved unless a new role is created.

(6) In the conventional group-based role authorization method, if the role has many permission function points, over time, it is difficult to remember specific permissions of the role, and it is even more difficult to remember the differences of permissions between roles that have similar permissions. If a new user needs to be related, it cannot be accurately determined how to select a relation. In the method in the present application, the role itself has a nature of a post number or work station number, and the selection can be made easily.

(7) When a user is transferred from a post, if many permissions of the transferred user need to be assigned to other users, in processing, separating the permissions of the transferred user and creating roles to relate to other users are necessary. The operations are complicated, time-consuming, and prone to errors.

The method in the present application is as follows: The transferred user is related to several roles. When the user is transferred, the relation between the user and the roles in the original department is first cancelled (the cancelled roles may be re-related to other users), and then the user is related to a role in a new department. The operation is simple and not error-prone.

(8) The role belongs to a certain department, the department cannot be replaced. Reasons that the department cannot replaced for the role are as follows:

Reason 1: As the role in the present application is equivalent to a work station number or a post number in nature, different work station numbers or post numbers have different work content or permissions. For example, a role of a salesperson 1 under a sales department and a role of a developer 1 under a technical department are two completely different work station numbers or post numbers, and have different permissions.

Reason 2: If the department (sales department) to which the role of the salesperson 1 belongs is replaced by the technical department without changing the permissions of role of the salesperson 1, a role that owns the permissions of the sales department exists in the technical department. This leads to management confusion and security vulnerabilities.

(9) One role can exist at different approval nodes in one approval process. The permissions can be set for each approval role of each approval node independently. The approval role may own different permissions of viewing and modifying the form field at different approval nodes. Exemplary advantages: A role is a Chengdu sales manager 3. In a contract approval workflow, the role exists at two approval nodes: an approval node of Chengdu sales contract, and an approval node of Shanghai sales contract. At the approval node of Chengdu sales contract, the role can view the content of all fields of a contract, such as a customer name, a contact person, contact information, a product quantity, a unit price of products, and a contract amount, and can modify the unit price of products and the contract amount. However, at the approval node of Shanghai sales contract, the role cannot view the content of sensitive fields such as the customer name, contact person, and contact information, and cannot make modifications thereto. In this way, the permissions of the role set in the approval process can be customized.

BRIEF DESCRIPTION OF THE DRAWINGS

Description of the Drawings

Figure 1:
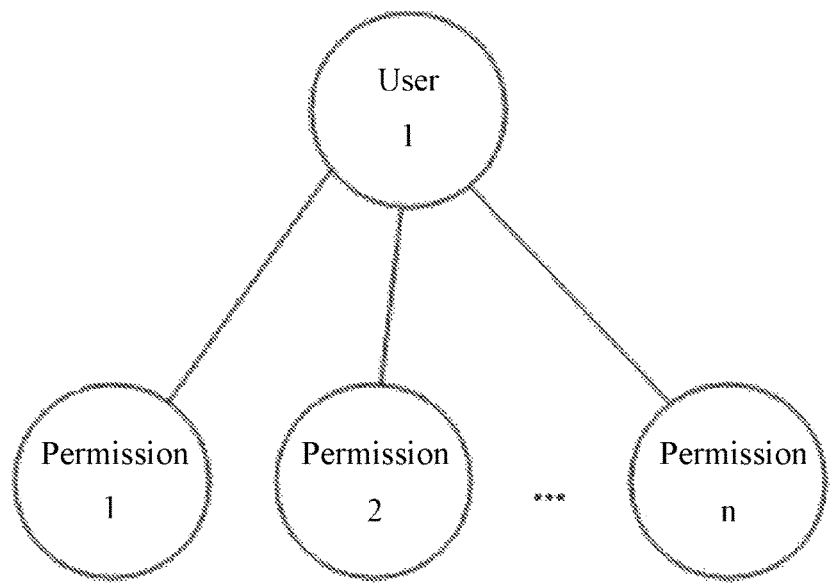
Figure 2:
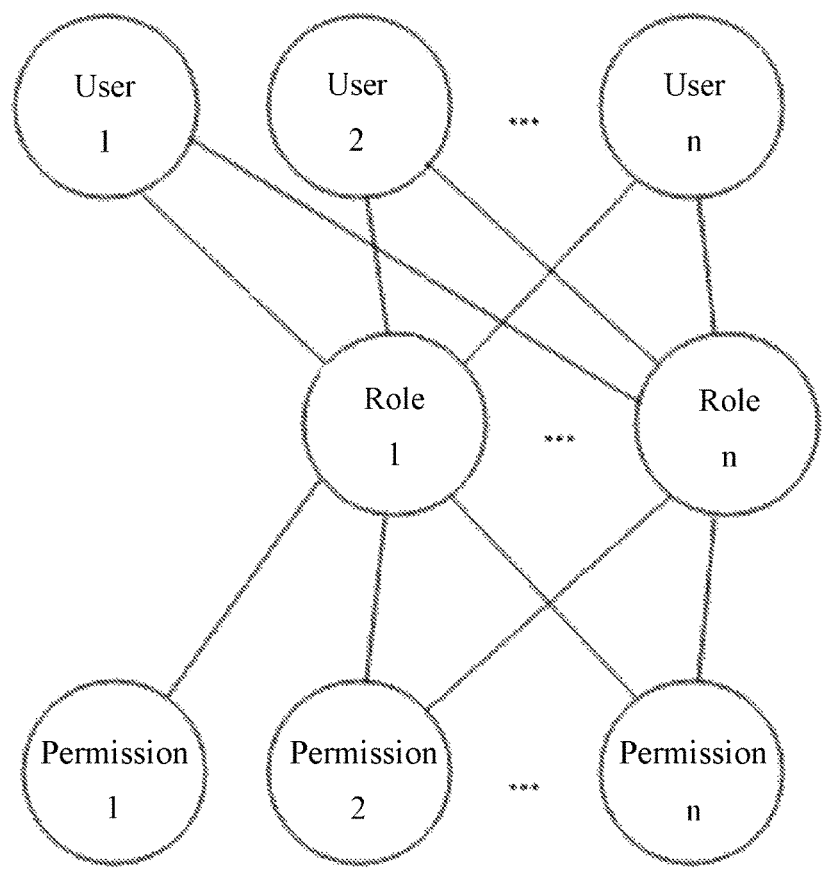
Figure 3:
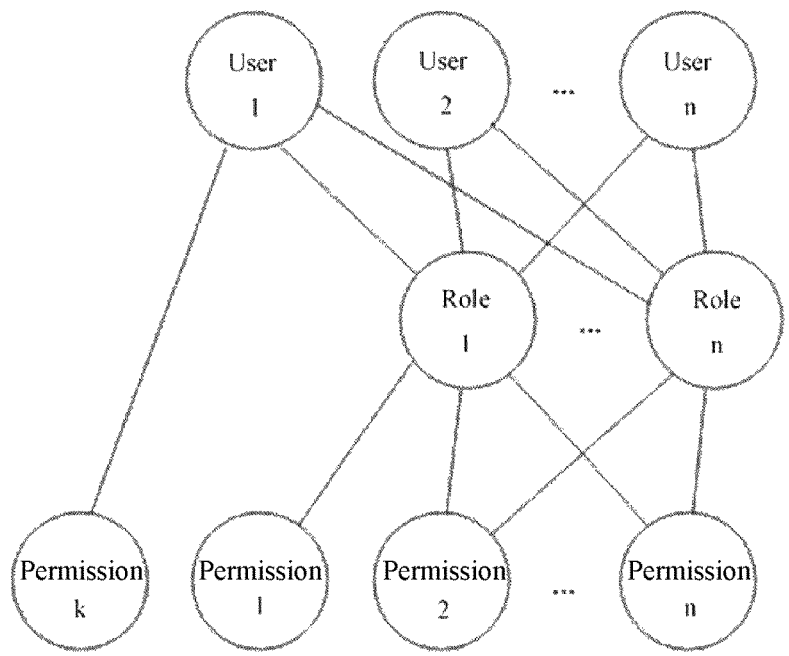
Figure 4:
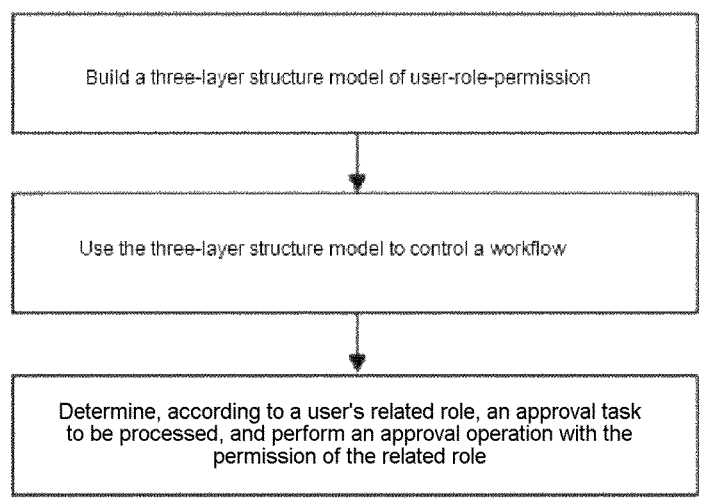
Figure 5:
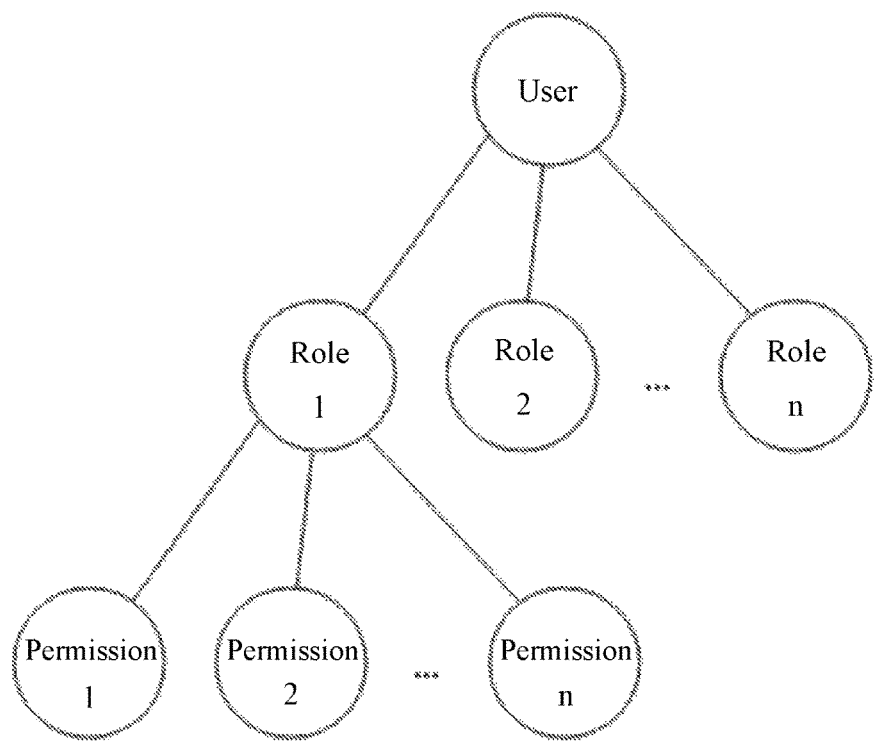
Figure 6:
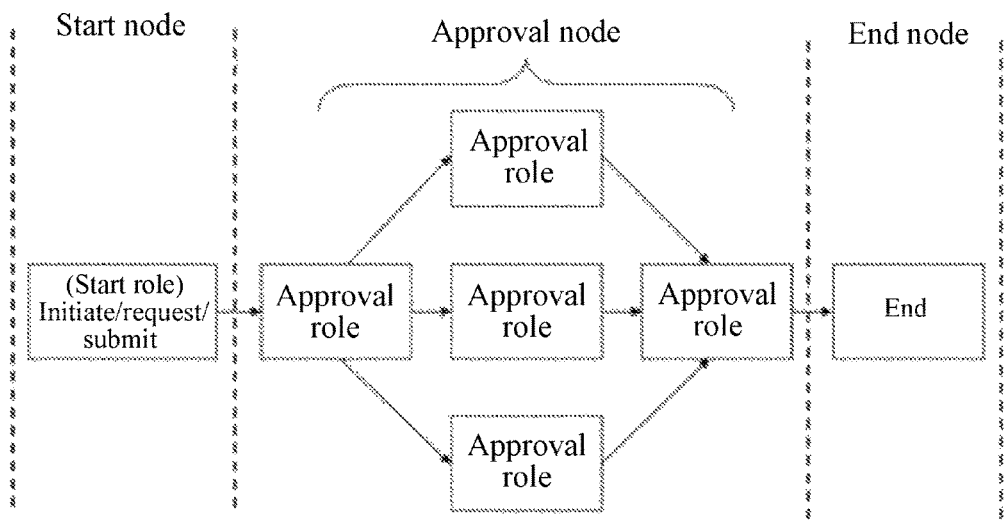
Figure 7:
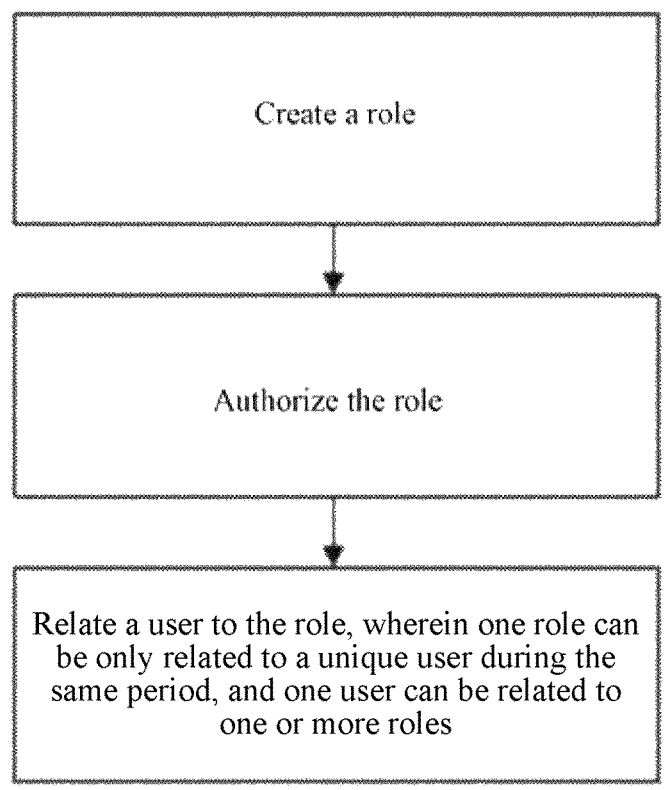

FIG. 1 is a schematic diagram in which a system directly authorizes a user in the prior art;

FIG. 2 is a schematic diagram in which a system authorizes a role of a group or class nature in the prior art;

FIG. 3 is a schematic diagram in which a system both directly authorizes a user and authorizes a role of a group or class nature in the prior art;

FIG. 4 is a flowchart of a workflow control method according to the present invention;

FIG. 5 is a schematic diagram in which a system authorizes a user through a role of an independent individual nature according to the present invention;

FIG. 6 is a schematic diagram of a workflow approval process according to the present invention; and FIG. 7 is a flowchart of a user-role authorization method according to the present invention.

DETAILED DESCRIPTION

Description of Embodiments

The technical solutions of the present invention will be described in further detail below with reference to the accompanying drawings, but the protection scope of the present invention is not limited to the following.

[Embodiment 1] As shown in FIG. 4, a workflow control method based on a one-to-one correspondence between roles and users includes the following steps:

S1: Building a three-layer structure model of user-role-permission that includes:

a role layer, wherein an operation subject of process approval in a workflow is a role, each role is an independent individual rather than a group or class, one role can only be related to a unique user during the same period, and one user is related to one or more roles;

a permission layer including a permission required to be used in the execution of the workflow, wherein the permission is directly granted to a role, and a user layer, wherein a user determines an approval task in the workflow through a related role, and performs an approval operation with the permission of the related role.

S2: As shown in FIG. 6, using the three-layer structure model to control the workflow, wherein one approval process includes:

one start node initiating or requesting or submitting the workflow, at least one approval node selecting an approval role and authorizing the approval role, and one end node, to which the approval process comes and then is ended.

S3: determining, according to a user's related role, an approval task to be processed, and perform an approval operation with the permission of the related role.

When a workflow is initiated or requested or submitted at the start node, a start role initiates or requests or submits the workflow, wherein only a role having the permission to start a workflow can initiate or request or submit the workflow as the start role.

When a workflow is initiated or requested or submitted at the start node, a system determines an approval process based on a form submitted by the start role.

When a workflow is initiated or requested or submitted at the start node, one or more approval processes are designed for a form that requires a workflow, but one role can only select one approval process under the form (the same role can exist in only one of the processes of the same form).

For example, there are two processes such as a P1 process and a P2 process in a purchase contract. If a role A is selected at a start node of the P1 process, the role A cannot be selected any more at the start node of the P2 process. In this case, approval of the purchase contract is added to the role A, and the purchase contract submitted for approval enters the P1 process automatically.

One or more approval roles are selected at the approval node, one role can exist at different approval nodes in one approval process, and the approval role may own different permissions for viewing and modifying a form field at different approval nodes. Exemplary advantages: A role is a Chengdu sales manager 3. In a contract approval workflow, the role exists at both approval nodes of Chengdu sales contract and Shanghai sales contract. At the approval node of Chengdu sales contract, the role can view a customer name, a contact person, contact information, a product quantity, a unit price of products, and a contract amount, and may modify the unit price of products and the contract amount. However, at the approval node of Shanghai sales contract, the role cannot view the sensitive fields such as the customer name, contact person, and contact information, and the like, and cannot make any modifications (alternatively, the role may be set to have the view permission but no modification permission).

One or more approval roles are selected at the approval node, an approval role's permission is set at the approval node, and the permission can be independently set for each approval role of each approval node. For example, two approval roles, namely, a role A and a role B, are set at an approval node in the approval process of a contract form. It may be set that the role A is allowed to view a contract price field in the contract form and the value of the field, and allowed to view a customer address field in the contract form and the value of the field. The role B is not allowed to view the contract amount field in the contract form, or allowed to view the contract amount field but not allowed to view the value of the field. The value not allowed to be viewed may be shown as other symbols such as *. The role B can view the customer address field in the contract form and the value of the field.

[Embodiment 2] As shown in FIG. 5 and FIG. 7, step S1 includes the following sub-steps:

S101: creating a role, wherein each role is an independent individual rather than a group or class;

S102: authorizing roles created in step S101 respectively; and

S103: relating a user to a role, wherein one role can only be related to a unique user during the same period, and one user is related to one or more roles.

Step S101 is preceded, but step S102 and step S103 have no sequential relationship.

The user determines the permissions through its relation to the role. If the permissions of user need modification, the permissions possessed by the role are adjusted to achieve to the purpose of changing the permissions of the user related to the role. Once the user is related to the role, the user owns all operation permissions of the role.

A role is in a one-to-one relation to a user (when the role is related to one user, other users can no longer be related to the role; if the role is not related to the user, the role can be selected to be related to another user). A user is in a one-to-many relation to roles (one user can be related to multiple roles at the same time).

Definition of a role: A role is not in the nature of a group/class/category/post/position/work type or the like, but is of a non-collective nature. The role is unique and is an independent individual. Applied in an enterprise or an institution, the role corresponds to a post number (the post number herein is not a post, one post may have multiple employees at the same time, but one post number can only correspond to one employee during the same period).

For example, in a company system, the following roles may be created: a general manager, a deputy general manager 1, a deputy general manager 2, a manager of Beijing sales department I, a manager of Beijing sales department II, a manager of Beijing sales department III, a Shanghai sales engineer 1, a Shanghai sales engineer 2, a Shanghai sales engineer 3, a Shanghai sales engineer 4, a Shanghai sales engineer 5, and so on.

The relation between users and roles is as follows: If Zhang San, the company's employee, serves as a deputy general manager 2 of the company and also serves as a manager of Beijing sales department I, roles to which Zhang San needs to be related to are the deputy general manager 2 and the manager of Beijing sales department I, and Zhang San has the permissions of the two roles.

Authorization for a role: the system's authorization for a role includes, but is not limited to, authorization of a form, authorization of a menu, or authorization of a function. Authorization for the operation of a form includes, but is not limited to, addition, deletion, insertion and modification.

The concept of conventional roles is a group/class/post/position/work type in nature, and one role can correspond to multiple users. In the present application, the concept of "role" is equivalent to a post number/work station number, and is also similar to the role in the film and television drama: one role (in childhood, juvenile, middle-age . . . ) can be played by only one actor or actress at the same time, but one actor may play multiple roles.

Authorization for a role includes, but is not limited to, authorization of a form, authorization of a menu, or authorization of a function.

The role belongs to a certain department, the role is unique under the department, and the role is authorized according to work content of the role.

If the user wants to change a department, it involves cross-department transfer. The specific operation process includes:

(1) cancelling the user's relation to the role in the original department; and (2) relating the user to a role in a new department.

After the role is created, the role may be related to a user in the process of creating the user, or may be related to at any time after the user is created. After the user is related to the role, the user can be released from the relation to the role at any time, and the relation between the user and another role may be created at any time.

[Embodiment 3] Step S1 includes the following sequential sub-steps:

S101: creating a role, wherein each role is an independent individual rather than a group or class;

S102: relating a user to a role, wherein one role can only be related to a unique user during the same period, and one user is related to one or more roles; and S103: authorizing roles created in step S101 respectively.

The role belongs to a certain department, the role is unique under the department, and the role is authorized according to work content of the role.

The workflow control method further includes a step of managing cross-department transfer of a user, which specifically includes:

(1) cancelling the user's relation to the role in the original department; and (2) relating the user to a role in a new department.

[Embodiment 4] A workflow control system based on a one-to-one correspondence between roles and users includes a model construction unit, a workflow control unit, and an approval operation unit.

The model building unit is used to build a three-layer structure model of user-role-permission that includes:

a role layer, wherein an operation subject of process approval in a workflow is a role, each role is an independent individual rather than a group or class, one role can only be related to a unique user during the same period, and one user is related to one or more roles, a permission layer including a permission required to be used in the execution the workflow, wherein the permission is directly granted to a role, and a user layer, wherein a user determines an approval task in the workflow through a related role, and performs an approval operation with the permission of the related role.

The workflow control unit controls the workflow by using the three-layer structure model, wherein one approval process includes:

one start node initiating or requesting or submitting the workflow;

at least one approval node selecting an approval role and authorizing the approval role; and one end node, to which the approval process comes and then is ended.

In the approval operation unit, the user determines, according to the role related to the user, the approval task to be processed, and performs the approval operation with the permission of the related role.

The model building unit includes:

a role creation submodule used to perform role layout according to posts and create system roles, wherein each role is an independent individual rather than a group or class;

a role authorization submodule used to authorize the role according to work content of the role; and a user-role relation submodule used to relate the user to the role, ensuring that one role can be related to a unique user during the same period, and one user is related to one or more roles.

The system role is composed of: a post name+a post number, for example, a workshop worker 1, a workshop worker 2, a workshop worker 3, and so on. A role is an independent individual, and is equivalent to a concept of a post number or a work station number, but different from a role in a conventional permission management system. The concept of a role in a conventional permission management system is of a group or class nature such as a post, a position, a work type or the like.

[Embodiment 5] The following example shows the relationship among an employee, a user, and a role after Zhang San, an employee, enters a company.

1. Recruiting: after the employee is recruited, he is directly related to the role of the corresponding post number or work station number for the user (employee). For example, when Zhang San has joined the company (the company has assigned a user for Zhang San) and works at the sales department I to be responsible for sales of refrigerator products in Beijing area (the corresponding role is "sales engineer 5" under the sales department I), then the user Zhang San directly selects and is related to the role "sales engineer 5".

2. Adding position: After Zhang San has worked for a period of time, the company will arrange Zhang San to be responsible for sales of TV products in Beijing area (the corresponding role is "sales engineer 8" under the sales department I) and to serve as a supervisor of an after-sales department (the corresponding role is "after-sales department supervisor 1). Therefore, two roles, that is, "sales engineer 8" under the sales department I and "after-sales department supervisor 1" under the after-sales department, are additionally related to the user Zhang San. In this case, the employee Zhang San is related to three roles: "sales engineer 5" and "sales engineer 8" under the sales department I, and "after-sales department supervisor 1" under the after-sales department. Therefore, the user Zhang San owns the permissions of the three roles.

3. Reducing position: After a while, the company has decided to let Zhang San serve as an after-sales department manager (corresponding to a role "after-sales manager" under the after-sales department) without taking up other positions any more. Therefore, the user Zhang San is related to the role "after-sales department manager" under the after-sales department, and is released from the relation to the previous three roles ("sales engineer 5" and "sales engineer 8" under the sales department I, and "after-sales department supervisor 1" under the sales department). In this case, the user Zhang San owns only the permissions of the role "after-sales department manager" under the after-sales department.

4. Adjusting permission of a role (adjusting the permissions of the role itself): If the company has decided to add permissions to the after-sales department manager, the permissions only need to be added to the role of the after-sales department manager. With the increase in the permissions of the role of the after-sales department manager, the permissions of the user Zhang San are also increased.

5. Resigning: After one year, Zhang San resigns. It only needs to cancel the relation between the user Zhang San and the role "after-sales department manager" under the after-sales department.

For example, during the dynamic operation of the company, recruiting and resigning of staff often occur continuously, but post numbers or work station numbers seldom change (or even remain unchanged within a period of time).

Conventional authorization method: In the case of a large quantity of system functions, authorizing a role conventionally as a group or class in nature involves a large and cumbersome workload and is very error-prone, and errors are not easily detectable in a short time and tend to cause loss to a system user.

Authorization method of the present application: in the present application, the role being a post number or work station number in nature is authorized, and the user is related to the role to determine its permissions. Therefore, the permissions of the user are controlled by only a simple user-role relation. Controlling the permissions is simple, easily operable, clear, and explicit, thereby significantly improving the efficiency and reliability of authorization.

The conventional role-based user permission management and workflow control methods adopt a "role-to-user one-to-many" relation mechanism, where the "role" is a group or class in nature. To be specific, one role may correspond to or be related to multiple users at the same time. The role is similar to a concept such as a post or a position or a work type. Basically, the user's permissions under this relation mechanism may be granted in the following three ways:

1. As shown in FIG. 1, the permission is directly granted to the user, where disadvantage is that it leads to large workloads and frequent and cumbersome operations. In the approval process, the approval operation subject of the approval node is the user, and the workflow approval node directly selects the employee or user as the approval subject. When changes on an employee have occurred (such as transfer or resignation), all processes related to the employee shall be adjusted accordingly. Especially, for the change of the employee in the management position of a company, many approval processes are involved, and the adjustment of the processes involves large workloads, and is cumbersome and prone to errors and omissions. This affects normal operation of the company, or even causes unpredictable losses.

Even if the change occurs only in the approval permissions of the employee, it is still necessary to correspondingly adjust the processes related to the employee, and the similar problems described above still occur.

2. As shown in FIG. 2, the role (of a class/group/post/work type nature) is authorized (one role may be related to multiple users), the user obtains permissions through its role, and the approval operation subject is the role of a group or class nature.

3. As shown in FIG. 3, the above two ways are combined.

In the above description, as both 2 and 3 need to authorize the role of a class or group nature. The way of authorization and workflow control through the role of a class/group/post/work type nature has the following disadvantages:

1. Operations are difficult when user permissions have changed: In the actual process of using a system, the user's permissions often need to be adjusted during the operation process. For example, in processing of the change of an employee's permissions, when the permission of an employee related to the role has changed, it is improper to change the permissions of the entire role due to the change of the permissions of the individual employee, because the role is also related to other employees whose permissions remain unchanged. In order to respond to this situation, either a new role is created to fit the employee whose permissions have changed, or permissions are directly granted to the employee (disengaged from the role) based on permission requirements. The above two processing methods not only take a long time but also cause mistakes easily for the role authorization in the case of a large number of role permissions. It is cumbersome for a user to operate, and errors occur easily, resulting in loss to the system user.

When the approval permissions of the employee or user have changed, either the employee or the user is disengaged from the role, and at the workflow approval node, the employee or the user is directly selected as an approval subject, or a new role is added to meet the requirements of the approval process. In the first way, when changes on an employee have occurred (such as transfer or resignation), all processes related to the employee shall be adjusted accordingly. Especially, for changes on an employee in a management position of an enterprise, many approval processes are involved. As the adjustment of the processes involves large workloads, errors or omissions are likely to occur, affecting the normal operation of the enterprise and even causing unpredictable losses. Even if the change only occurs in the approval permissions of the employee, it is still necessary to correspondingly adjust the processes related to the employee, and similar problems described above still occur. In the second way, adding a role involves creation, relation, and authorization of the role. Especially when there are many roles and many users related to the roles, it is difficult to remember which users are related to the role.

2. It is difficult to remember the specific permissions contained in a role for a long time: If the role has many permission functions, over time, it is difficult to remember the specific permissions of the role, and it is even harder to remember the differences in permissions between roles with similar permissions. The permissions of similar roles are also easily confusable. If a new user needs to be related, it cannot be accurately determined how to select the relation.

3. Because user permissions change, it results in more roles created (if new roles are not created, it greatly increases direct authorization to the user), and it is more difficult to distinguish specific permission differences between the roles.

4. When a user is transferred from a post, if many permissions of the transferred user need to be assigned to other users, separating the permissions of the transferred user and creating roles to relate to other users are necessary. The operations are complicated, time-consuming, and prone to errors.

The above is only a preferred embodiment of the present invention, and it should be understood that the present invention is not limited to the forms disclosed herein, and is not to be construed as being limited to the other embodiments, but may be used in various other combinations, modifications and environments. Modification can be made in by the techniques or knowledge of the above teachings or related art within the scope of the teachings herein. All changes and modifications made by those skilled in the art are intended to be within the scope of the appended claims.

What is claimed is:

1. A workflow control method comprising:
   building a three-layer structure model of user-role-permission that comprises:
   a role layer, wherein an operator of an approval process in a workflow is a role, the role is independent which is not a group or class, wherein the role is configured to be related to a user only during a same period, and the user is configured to be related to the role or more roles, a permission layer comprising a permission required to be used in the execution of the workflow, wherein the permission is directly granted to the role, and a user layer, wherein the user determines the approval process in the workflow through the related role or more roles, and performs an approval operation with the permission of the related role or more roles;

configuring an approval process based on the three-layer structure model, wherein the approval process comprises:

a start node initiating the workflow, at least one approval node selecting one or more roles, and authorizing the selected one or more roles; and an end node, wherein the approval process is ended; and determining, by a user related to one of the authorized one or more roles, at least an approval process to be processed, and performing at least an approval operation with the permission of the user's related authorized roles at the at least one approval node.

2. The workflow control method according to claim 1, wherein when a workflow is initiated at said start node, a start role initiates the workflow, wherein only a role having the permission to start a workflow can initiate the workflow as the start role.

3. The workflow control method according to claim 1, wherein a workflow is initiated at said start node, a system is configured to determine an approval process according to a form submitted by a start role.

4. The workflow control method according to claim 1, wherein a workflow is initiated at said start node, one or more approval processes are designed for a form that requires a workflow, wherein one role is configured to select only one approval process under the form.

5. The workflow control method according to claim 1, wherein one or more roles are selected at said approval node, one role can exist at different approval nodes in one approval process, and the role may own different permissions for viewing and modifying a form field at different approval nodes.

6. The workflow control method according to claim 1, wherein one or more roles are selected at said approval node, each role's permission is set at said approval node, and the permission can be independently set for each role of each approval node.

7. The workflow control method according to claim 1, wherein building the three-layer structure model comprising:

creating one or more roles, wherein each role is independent which is not a group or class;

authorizing the created one or more roles respectively; and relating a user to a role, wherein the role is configured to be related to the user only during a same period, and the user is configured to be related to the role or more roles, wherein, wherein the relating of the user to the role or more roles and the authorization of the created one or more roles have no sequential relationship.

8. The workflow control method according to claim 1, wherein each role belongs to a department, being unique under the department, and each role is authorized according to work content of the role.

9. The workflow control method according to claim 8, further comprising:

managing cross-department transfer of the user, which comprises:

cancelling the user's relation to the role in an original department; and relating the user to a role in a new department.

10. A workflow control system, comprising a processor, a memory storing instructions that, when executed by the processor, causes the workflow control system to:

build a three-layer structure model of user-role-permission comprises:

a role layer, wherein an operator of an approval process in a workflow is a role, the role is independent which is not a group or class, wherein the role is configured to be related to a user only during a same period, and the user is configured to be related to the role or more roles, a permission layer comprising a permission required to be used in the execution of the workflow, wherein the permission is directly granted to the role, and a user layer, wherein the user determines the approval process in the workflow through the related role or more roles, and performs an approval operation with the permission of the related role or more roles;

configure an approval process based on the three-layer structure model, wherein the approval process comprises:

a start node initiating the workflow;

at least one approval node selecting one or more roles and authorizing the selected one or more roles; and an end node, wherein the approval process is ended;

wherein a user determines, according to one of the one or more roles related to the user, at least an approval process to be processed, and performs at least an approval operation with the permission of the user's related authorized roles at the at least one approval node.

11. The workflow control system according to claim 10, wherein the workflow control system is further configured to:

perform role layout according to posts and create system roles, wherein each role is an independent individual rather than a group or class;

authorize the role according to work content of the role; and relate the user to the role, wherein one role is configured to be related to the user only during a same period, and the user is configured to be related to the one or more roles.

12. The workflow control system according to claim 11, wherein said system role comprises a post name and a post number.

* * * * *